May 20, 1952     G. R. BOUCHARD     2,597,773
MECHANICAL RELAY

Filed Feb. 26, 1948     7 Sheets-Sheet 1

INVENTOR
GASTON ROBERT BOUCHARD
BY
ATTORNEYS

May 20, 1952   G. R. BOUCHARD   2,597,773
MECHANICAL RELAY

Filed Feb. 26, 1948   7 Sheets-Sheet 3

INVENTOR
GASTON ROBERT BOUCHARD
BY
ATTORNEYS

May 20, 1952  G. R. BOUCHARD  2,597,773
MECHANICAL RELAY
Filed Feb. 26, 1948  7 Sheets-Sheet 4

INVENTOR
GASTON ROBERT BOUCHARD
BY
ATTORNEYS

May 20, 1952

G. R. BOUCHARD 2,597,773

MECHANICAL RELAY

Filed Feb. 26, 1948

INVENTOR
GASTON ROBERT BOUCHARD
BY
ATTORNEYS

May 20, 1952 G. R. BOUCHARD 2,597,773
MECHANICAL RELAY
Filed Feb. 26, 1948 7 Sheets-Sheet 6

INVENTOR
GASTON ROBERT BOUCHARD
BY
Bailey, Stephens & Huettig
ATTORNEYS

May 20, 1952  G. R. BOUCHARD  2,597,773
MECHANICAL RELAY
Filed Feb. 26, 1948  7 Sheets-Sheet 7

INVENTOR
GASTON ROBERT BOUCHARD
BY
Bailey, Stephens & Huettig
ATTORNEYS

Patented May 20, 1952

2,597,773

UNITED STATES PATENT OFFICE 2,597,773

MECHANICAL RELAY

Gaston Robert Bouchard, Saint-Germain-en-Laye, France

Application February 26, 1948, Serial No. 11,251
In France November 26, 1938

Section 1, Public Law 690, August 8, 1946
Patent expires November 26, 1958

17 Claims. (Cl. 74—334)

The present invention relates to mechanical relays, that is to say devices to be inserted in reciprocating motion transmitting systems (including levers, rods, cables, fluid conduits, for instance) the transmission system being possibly, in some cases, dispensed with, either wholly or partly, as well on one side as on the other of the relay.

The object of the present invention is to provide a relay of this kind which permits of obtaining, in response to a selection movement of constant direction and variable amplitude and of a driving movement of constant direction and amplitude, resulting displacements of parts which may be of amplitude and direction different from those of the driving movement and different from one another.

Hereinafter, I will designate by "primary" the portion of the device which receives motion from the outside, "secondary" the portion which retransmits this motion to the outside and "casing" the fixed portion which ensures the positioning of these two first mentioned portions and supports their reactions.

Preferred embodiments of my invention will be hereinafter described with reference to the accompanying drawings, given merely by way of example, and in which:

Figs. $2_1$, $2_2$ and $2_3$ are diagrammatic sections on the lines $2_1$, $2_2$ and $2_3$ respectively of Fig. 4;

Figs. $5_1$ and $5_2$ are perspective views of two elements of the mechanism of Figs. 5 and 6;

Figs. 20 and 21 are sectional views, respectively on the lines XX—XX of Fig. 21 and XXI—XXI of Fig. 20 of a relay device made according to a modification.

Figure 1:
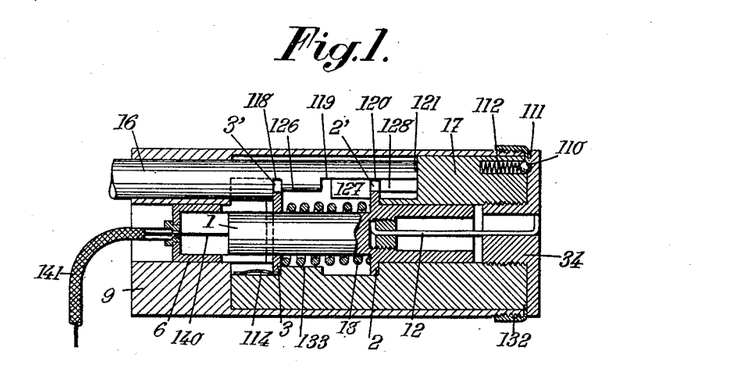
Fig. 1 is a side view, partly in longitudinal section, of a device according to the invention characterized by the use of rotation movements for selection purposes and translation movements for driving purposes. The secondary, constituted by sliding rods, is disposed circularly around the primary.
Figure 2:
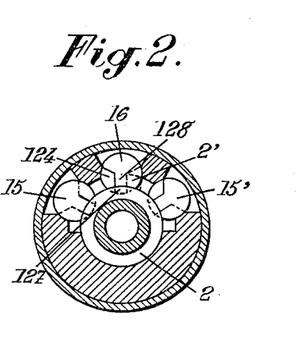
Fig. 2 is a partial end view of this embodiment.
Figure 3:
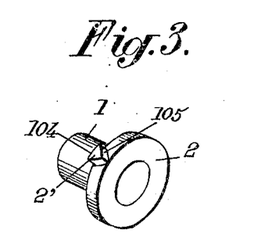
Fig. 3 is a perspective view of one of the pieces of the primary.

In the embodiment of Fig. 1, the primary is made in the following manner:

A spindle or shaft 1 carries a collar or flange 2 provided with a lug 2', said lug including a flat face 104 and two oblique faces 105 (Figs. 3 and 4a to 4f). Spindle 1 is slidable in a tubular piece 6 adapted to rotate together with said spindle owing to the provision of suitable connecting means (constituted by a pin and slot connection in the embodiment of Fig. 1). Piece 6 is provided, similarly with spindle 1, with a collar or flange 3 carrying a lug 3' identical to lug 2' and located in the same diametral plane. A spring 18 is interposed between flanges 2 and 3. The interval between flanges 2 and 3 is limited by any suitable abutment of spindle 1 in tube 6 (constituted by a lug for instance) and either of the extreme positions of one of these pieces 1 and 3 is fixed by an elastic system carried by casing 17—9 and bearing upon any portion of one of these pieces (for instance spring 114).

The whole of the above mentioned parts is connected through a torsional spring 12 to a drum 34 provided with notches or recesses 119 disposed along a circular arc so as to pass opposite a ball 111 pushed toward said drum by a spring 112 housed in casing element 17. Drum 34 can only rotate with respect to the casing without being capable of moving longitudinally to any material extent with respect thereto, whereas pieces 1 and 6 can both rotate and slide longitudinally with respect to this casing. Accordingly, spring 12 will be made slidable with respect to either piece 1 or to piece 34. In order to facilitate the construction and assembly of the parts, drum 34 is movable with respect to part 17 by screwing and unscrewing, the pitch of the screw threads being very small so that a substantial relative rotation of parts 17 and 34 involves a practically negligible axial relative displacement thereof.

Figure 21:
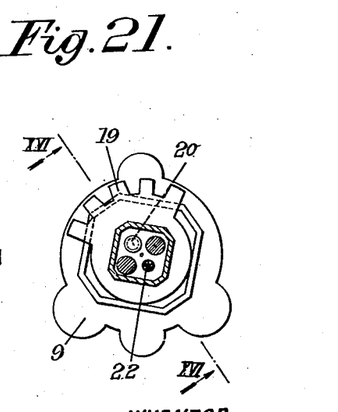

The secondary includes a plurality of rods (the number of rods to be provided depending upon the characteristics of the device to be controlled) the axes of which are generatrices of a cylinder coaxial with spindle 1 and the intervals between which (preferably equal for all of them) are at least sufficient to permit longitudinal sliding of lug 2' therein. These rods are assembled on casing member 17 (Figs. 2₁, 2₂ and 2₃) by radial insertion before the whole is slipped inside casing 9. Each of these rods is adapted to occupy any of three given positions, which will be hereinafter called "front," "rear" and "intermediate" or "neutral" positions.

Figure 4A:
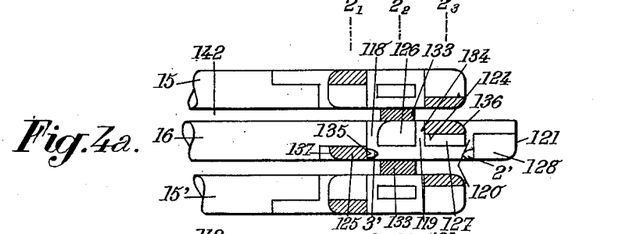
Figs. 4a to 4e are each a partial development in a plane of the secondary (white portions) and the casing (cross hatched portions), some portions of the primary being also shown, these views corresponding respectively to different relative positions of the parts.
Figure 4B:
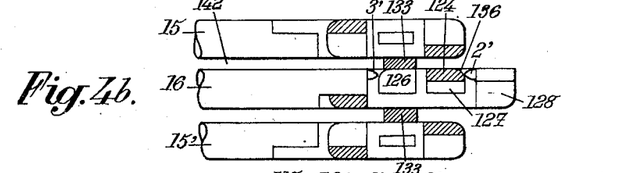
Figure 4C:
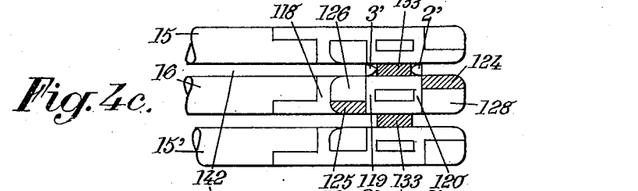
Figure 4D:
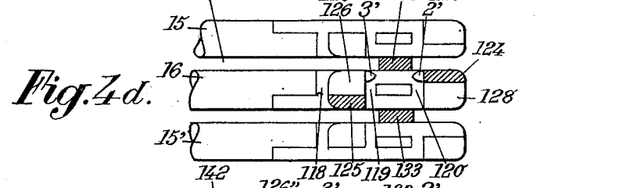

Figs. 2 and 4a to 4e show an example in which there are three rods, to wit 15 and 15', shown in intermediate position and 16 shown in rear position. Each of these rods (for instance 16) includes the following portions (Fig. 4f):

Four transverse recesses 118, 119, 120, 121 (the last one being constituted by the end of the rod) of different respective widths and arranged to afford passage for lugs 2' and 3' during rotary displacements of system 1—6;

Two longitudinal recesses 122 and 123 permitting longitudinal displacements of rod 16 in the casing despite the presence of projections 124 and 125 carried by this casing;

Three projections 126, 127 and 128 located between the above mentioned recesses. Projections 126 and 128 are each provided with a rounded guiding surface 129 and 130 and their height is such that they do not come into contact with flanges 2 and 3, but only with lugs 2' and 3', in the course of the displacements of the rods or of the primary. On the contrary, the height of projection 127 is such that it comes into contact with flanges 2 and 3. The position of these projections with respect to the axis of the rod makes it possible to reverse if necessary the order in which two positions of the drum follow each other for two given successive positions of the part to be controlled.

The casing has its inner surface shaped to accommodate the primary and the secondary. It is made of several elements, for instance a central body 17 fixed through a threaded cap 132 in an external body 9.

Furthermore, this casing is to include:

A projection 133 of any suitable shape but of a height corresponding to that of projection 127;

A plurality of projections such as 124 and 125 (Figs. 2 and 4a to 4e) the distance between the respective faces 134 and 135 of which is just slightly greater than the sum of the length of projection 133 and of the length of lugs 2' and 3'. The length of each of these projections 124, 125 is at most equal to that of projection 127; their height corresponds to that of projections 126 and 128; and each of them is provided with a rounded surface such as 136 and 137 analogous to the rounded portions 129 and 130 of projections 126 and 128.

Finally, parts 1 and 6 are connected with an external transmission system, which may be of any conventional type, such that any pull exerted on part 1 causes a corresponding thrust to be exerted on part 6. For instance, as illustrated by the drawing, a practically inextensible cable 140 fixed to spindle 1 is slidably mounted in a practically incompressible sheath 141 fixed to tubular part 6.

This relay device works as follows:

Normally all the parts (1, 6, 15, 16 and 15') are in the position in which they have been stopped at the end of a preceding operation. It will be supposed for instance that, as shown by Fig. 4a, this preceding operation brought rod 16 in the rear position and that it is now desired to bring it into the front position. To this effect lugs 2' and 3' will first be brought by means of drum 34, manually actuated and acting through torsion spring 12 on spindle 1, into the positions shown by Fig. 4b (selection operation).

If cable 140 is now pulled (first phase of the driving operation, Fig. 4c), spring 18 is compressed between flanges 2 and 3. Flange 2 comes into contact with projection 127 of rod 16 and drives said rod toward the left. The oblique face 105 of lug 2' slides along the rounded surface 136 of projection 124 of the casing, which causes the primary 1—6 to rotate and spring 12 to be twisted. Lug 2' comes into longitudinal passage 142 as shown by Fig. 4c. The reaction of sheath 141 of cable 140 applies flange 3 against the projection 133 of the casing. At the end of this movement, rod 16 and lugs 2' and 3' are in the positions illustrated by Fig. 4c, which corresponds to the intermediate or neutral position of rod 16 analogous to that of rod 15'. But the parts just pass through these relative positions, for, as soon as lug 2' has reached the left hand edge of projection 124, the primary 1—6 is urged by the action of torsion spring 12 into a position in which lugs 2' and 3' occupy the positions shown by Fig. 4d.

Figure 4E:
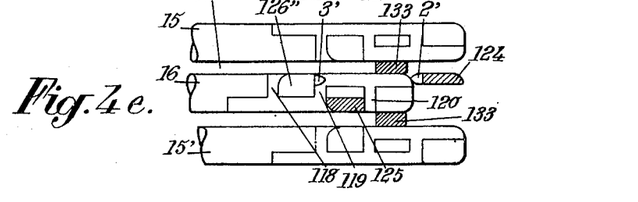
Figure 4F:
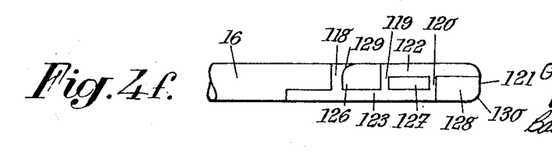
Fig. 4f is a separate view of a secondary element.

If cable 140 is then released (second phase of the driving operation), as lug 2' is bearing against the projection 124 of the casing, spring 18 acts upon flange 3 the lug of which pushes the projection 126 of rod 16 toward the left into the position shown by Fig. 4e. Rod 16 is thus brought into its front position.

Rod 16 might have been stopped in its intermediate or neutral position through another selection operation, the position of the lugs corresponding for instance to passages 142.

Figures 5, 6:
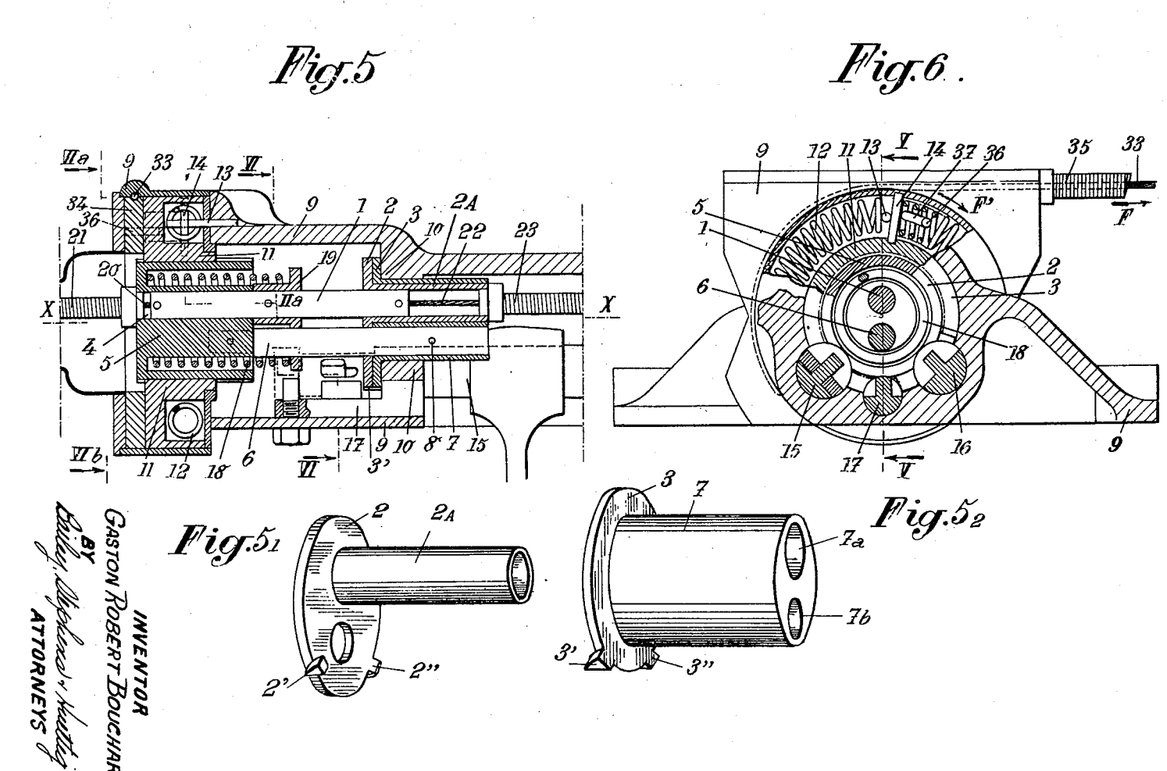
Figs. 5 and 6 are sectional views, respectively on the lines V—V of Fig. 6 and VI—VI of Fig. 5 of a hand operated relay made according to another embodiment of my invention, Fig. 6 showing portions cut on lines VIa—VIb of Fig. 5.

The embodiment of Figs. 5 and 6 is based on the same principle as that just above described as to the operation of rods 15 and 16 but is considered as constituting a more advantageous construction.

In this construction, the fixed portion or "casing" is constituted by an inner part 17 and an outer tubular body 9 in which part 17 is secured.

Body 9 includes a bearing 10 in which a tubular piece 7 is journalled, about the axis X—X of this bearing. Tubular piece 7 is provided with two cylindrical holes 7a, 7b (Fig. 5₂) parallel to said axis X—X. One of these holes, to wit 7b, accommodates a rod 6, keyed at one end, at 8, in said piece 7 and at the other end in a cylindrical piece 5, coaxial with piece 7. Piece 5 is slidable axially, but non-rotatable, with respect to an annular member 11 which surrounds it.

For instance the outer wall of piece 5 and the inner wall of member 11 are provided with cooperating longitudinal ribs.

Annular member 11 is rotatable in an extension of casing 9. A coil spring 12 is mounted in an annular groove of said member 11. One end of spring 12 is applied against a pin 13 carried by casing 9 and the other end bears against a pin 14 carried by member 11 across said annular groove thereof.

Piece 5 is provided with a cylindrical hole in which one end of a spindle 1 is slidably guided. The other end of pin 1 is slidably guided in a cylindrical sleeve 2A itself slidably guided in the hole 7a of piece 7.

Sleeve 2A carries a circular flange 2 eccentric with respect to said sleeve but the axis of which coincides with X—X.

Piece 7 carries a circular flange 3, of the same diameter as flange 2 and the axis of which coincides also with X—X.

Flanges 2 and 3, which are to play parts analogous to those of flanges 2 and 3 of the embodiment of Figs. 1-4, are each provided with two lugs, 2' and 2" for flange 2, 3' and 3" for flange 3 (instead of a single lug for each flange) as in said first described embodiment. These lugs are visible on the detail perspective views of Figs. 5₁ and 5₂ (with the exception of lug 3" which is hidden by flange 3 on Fig. 5₂). As it will be seen, lugs 2' and 2" are at a greater angular interval from each other than lugs 3' and 3" so that flanges 2 and 3 can be applied against each other without the lugs interfering. As shown by the drawing, each pair of lugs overlaps the edge of the flange carrying the other pair of lugs (lugs 2' and 2" projecting from the right hand flat face of flange 2 and lugs 3' and 3" from the left hand flat face of flange 3).

Spindle 1 carries, fixed thereto, a flange 19 and a spring 18 is interposed between said flange 19 and the bottom of an annular groove of piece 5.

A cable 20 fixed at one end to one end of spindle 1 extends in a slidable manner through a sheath 21 one end of which is fixed to piece 5, so that by pulling cable 20 with respect to sheath 21, a relative motion of parts 1 and 5 toward each other is produced.

A cable 22 fixed at one end to the other end of spindle 1 extends in a slidable manner through a sheath 23 fixed to one end of sleeve 2A, so that by pulling cable 22 with respect to sheath 23 a relative motion of parts 1 and 2A toward each other is produced.

Flanges 2 and 3, with their lugs 2'—2" and 3'—3" essentially constitute the primary elements of the system, controlled as above described.

Figures 10, 11, 12, 12D, 12E, 13:
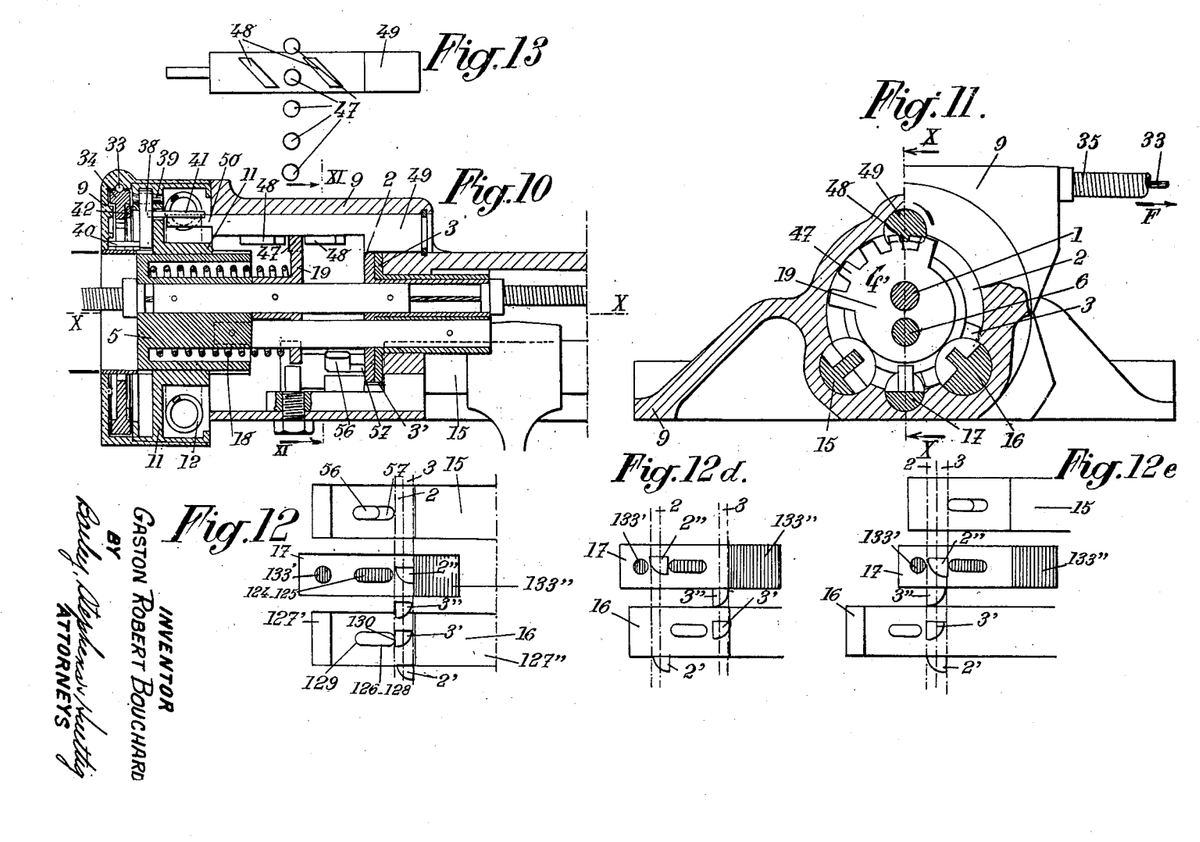
Figs. 10 and 11 are two sections, respectively on the lines X—X of Fig. 11 and XI—XI of Fig. 10 of a partly automatic selection relay device, the section line corresponding to Fig. 10 being also shown at X—X in Fig. 14.
Figs. 12, 12d and 12e are views, analogous to Figs. 4c, 4d and 4e, showing a partial development in a plane of the secondary (white portions) and casing (cross hatched portions) elements, the lugs 2', 2'', 3' and 3'' of the primary elements being also shown, these views corresponding respectively to different relative positions of the parts.
Fig. 13 is an explanatory detail view corresponding to Fig. 10.

The secondary elements are constituted in this case by two longitudinal rods 15 and 16 slidable in casing 9. Taking for instance rod 16, it includes (Fig. 12):

Projections 127', 127" and 126—128 (this double reference number being used in order clearly to show the analogy with the construction of Figs. 1-4; projection 126—128 is provided with rounded guiding surfaces 129 and 130 and its height is such that it cannot come into contact with flanges 2 and 3 but only with their lugs 2'—2" and 3'—3". On the contrary, the height of projections 127' and 127" is such that they can come into contact with flanges 2 and 3.

Casing element 17 is provided with:

Two projections 133' and 133" of a height corresponding to that of projections 127' and 127"; and A projection 124—125 of a height corresponding to that of projection 126—128.

In the longitudinal direction, the interval between projection 133' and projection 124—125, between projection 124—125 and projection 133" between projection 127' and projection 126—128, and between projection 126—128 and 127" is such that lugs 2', 2", 3', 3" can pass therethrough.

The operation of such a mechanism is quite similar to that of Figs. 1-4, but with the essential difference that in every position of operation (i. e. when the rod, for instance 16, which is the operative, is in active position), flanges 2 and 3 are located adjacent to each other, whereas a movement of said flanges away from each other causes this rod to come back into operative position. When the flanges are again caused to come against each other, the desired rod is brought into the desired operative position, according to the selecting position imparted to member 11 by rotation about axis X—X.

Every relative movement of flanges 2 and 3 away from each other is obtained in two successive steps.

The first step corresponds to a pulling of cable 1, which produces a compression of spring 18 due to a displacement of flange 19 toward piece 5, The second step is produced by pulling cable 22.

This action on spindle 1 is opposed by that exerted by cable 20. As the pull on cable 22 must however produce a relative displacement of the respective ends of cable 22 and sheath 23, it is sheath 23 which moves toward the left, pushing flange 2 and its cylindrical extension toward the left.

This movement of flanges 2 and 3 away from each other causes, through operations analogous to those shown by Figs. 4a, 4b and 4c, rods 15 and 16 to come back into neutral position as shown by Fig. 12d.

Then spring 18 is released by releasing cable 20 and this moves the main flanges 2 and 3 toward each other. As flange 2 is resting upon projection 133' of element 17, the other flange 3 drives through its lug 31 bearing against the projection 126—128 of rod 16, said rod into rearward position (Fig. 12e).

If it is supposed that rods 15 and 16 are the control means of an automobile vehicle gear box, in order to perform the above described movements, flanges 2 and 19 may be respectively connected, through their cables 20 and 22, with suitable points of the transmission provided between the clutch of this vehicle and the clutch pedal.

According to a preferred embodiment, the first of the above described steps is caused to take place when the clutch is let in, in such manner as to take advantage of the energy of the clutch springs to conpress the spring 18 of the relay, which spring 18 must however be released only after the clutch has been disengaged and flanges 2 and 3 have been moved away from each other.

Figures 7, 9:
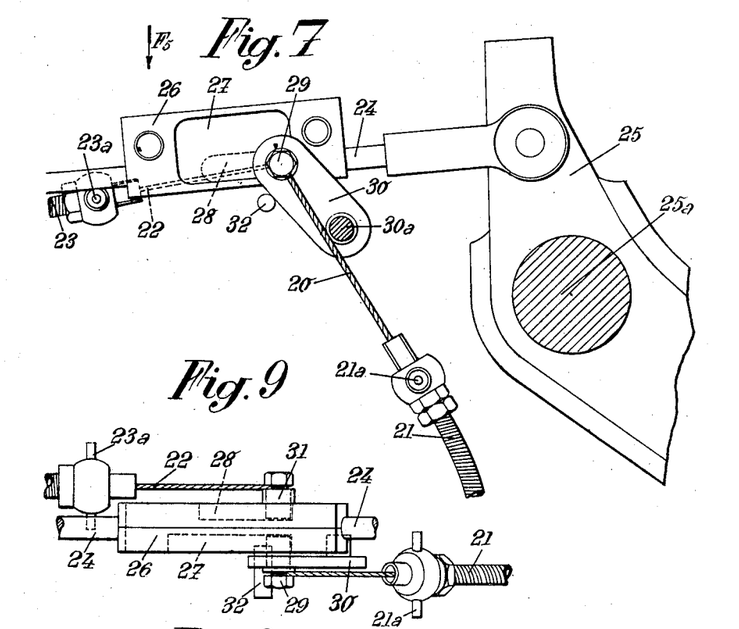
Figs. 7 and 8 show an accessory arrangement in two different positions, respectively.
Fig. 9 is a view of a portion of this system from the direction of arrow $F_5$ (Fig. 3)
Figure 8:
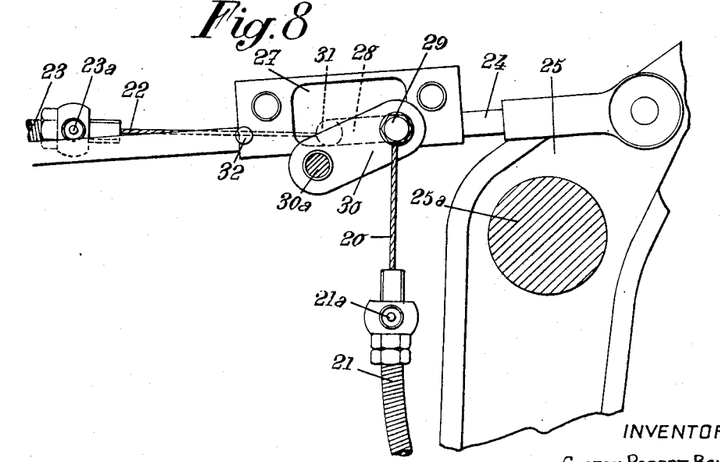

For this purpose, as shown by Figs. 7, 8 and 9, if 24 is a rod or link interposed between the clutch pedal 25 (pivoted to the frame at 25a) and the clutch lever, I fix on this rod a rectangular piece 26 provided, on one side, with a rectangular recess 27 and on the other side with a retilinear slot 28.

Sheaths 21 and 23 are secured to parts 21a and 23a fixed with respect to the frame.

Cable 20 is secured (at the end thereof opposed to that attached to spindle 1) to a lug 29 engaged in recess 27 and carried by the end of a small lever 30 pivoted to the frame about a fixed point 30a.

Cable 22 is secured (at the end thereof opposed to that attached to spindle 1) to a lug 31 engaged in slot 28.

The respective lengths of the sheaths and the position of piece 26 are adjusted in such manner that, when clutch pedal 25 is in its position of rest, i. e. the clutch is engaged:

On the one hand cable 20 is stretched, being in the position of Fig. 7 and held in this position, against the action of spring 18, due to the fact that the pull exerted by spring 18 tends to rotate lever 30 toward the left and a small abutment 32 prevents such a rotation of lever 30;

On the other hand, cable 22 is slack, as lug 31 is at the right hand end of slot 28.

With such an arrangement, if it is supposed that the driver of the vehicle wishes to shift from one gear combination to another one, he first selects, through means 33—34—11—12 hereinafter described, the desired gear combination by giving flanges 2 and 3 the corresponding angular positions about their common axis.

Then he depresses clutch pedal 25 so as to disengage the clutch, thus causing piece 26 to move toward the right hand side of the drawing.

For a certain time (corresponding to the displacement of recess 27 opposite lug 29) this does not modify the position of lever 30 and cable 20 remains stretched.

After a time, under the effect of the displacement of pedal 25, the left hand end of slot 28 comes into contact with lug 31 and moves it toward the right, so that cable 22 which initially was slack is pulled (second step of the above described operation of Fig. 5) and when the clutch is disengaged, cable 22 has caused flanges 2 and 19 to move toward each other as above described so that all the rods of the relay device are then in neutral position.

At the end of the downward movement of clutch pedal 25, the left hand side of recess 27 comes into contact with lug 29 and pushes lever 30 beyond the position for which points 21a, 30a and 29 are in line. Lever 29 snaps toward the right (Fig. 8), suddenly releasing spring 18 and causing the new gear combination to be brought into play.

When the driver allows pedal 25 to come back into its initial position under the action of the strong clutch springs acting thereon, piece 26 is pushed toward the left, restoring lever 30 into the position of Fig. 7, where spring 18 is again compressed.

In order to perform the selecting operation, that is to say to impart a given rotation to annular member 11, I make use, according to the embodiment of Figs. 5 and 6, of a cable 33 secured to another annular member 34 coaxial with 11, this cable 33 being slidable in a sheath 35 the end of which is fixed with respect to frame 9. Cable 33, at its other end, is fixed to a lever to be operated by the driver. Advantageously, I make use, as return spring for cable 33, of spring 12.

For this purpose, annular member 11 is driven by annular member 34, but with a lost motion in the connection between said members, so that member 11 is free to rotate to a limited degree with respect to member 34 in the direction corresponding to operation of the flange lugs.

Thus, as shown by Figs. 5 and 6, annular member 34 carries a pin 36 engaged in a slot 37 provided in the adjacent wall of annular member 11. When cable 33 is pulled in the direction of arrow F (Fig. 6) annular member 11, and therefore flanges 2 and 3, are therefore driven toward another position of selection, against the action of spring 12, on which member 11 acts through its pin 14. But when a lug of one of these flanges is to move along one of the projections of one rod 15, 16, which corresponds to imparting to annular member 11 a rotation of small amplitude in direction F' (Fig. 6), said member 11 can turn in this direction, its slot 37 moving with respect to fixed pin 36, and being urged toward normal position by spring 12.

Figure 19:
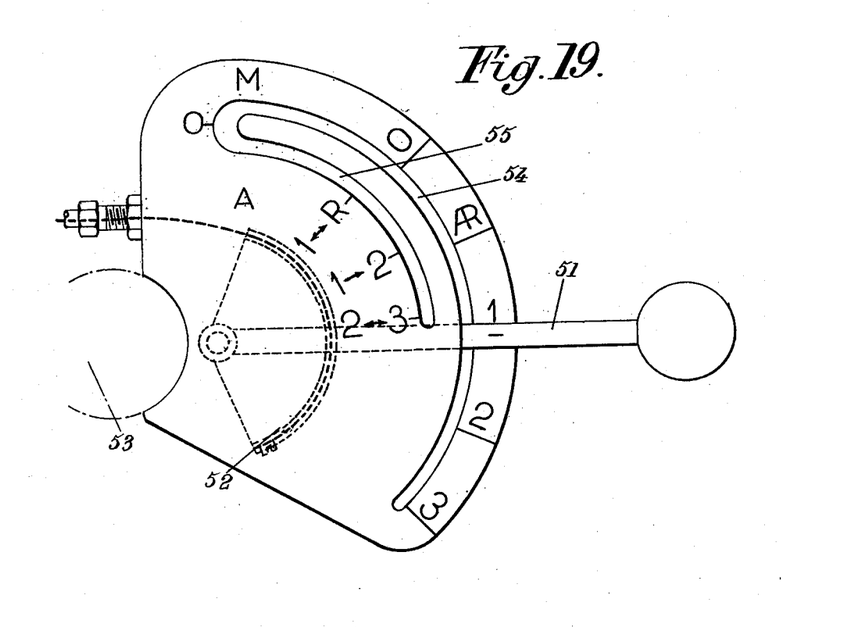
Fig. 19 shows an operating lever for selecting the working positions of this device.

In these conditions, it seems advantageous to hold annular member 34 in position by acting upon the lever to be operated by the driver. For this purpose, for instance, this lever is moved along a sector provided with notches corresponding to the various positions it is to occupy, for instance 0 (neutral), AR (reverse), 1, 2 and 3, for a gear box corresponding to three gear combination in addition to reverse (see Fig. 19).

I will now describe embodiments of my invention in which, in order to provide in the selection step of the operation of the device a certain automaticity, I take advantage of the longitudinal displacements of auxiliary flange 19 for imparting thereto the rotation movement that brings it into a desired position.

For this purpose, preferably, the holding of the selecting means in position should preferably take place no longer at the operating lever as above suggested but, in an at least partly automatic fashion, in the relay device itself.

Such an arrangement is illustrated by Figs. 10 and 14 to 18.

Annular member 11 carries a pawl 38 pivoted thereto about pivot axis 39.

The inner face of tubular member 34 is given an outline (shown by Figs. 14 to 18) including notches and oblique portions the function of which will appear hereinafter, the notches being adapted to accommodate a lug 40 carried by pawl 38. This lug 40 is urged to engage the notches of annular member 34 by spring 12 which bears against another lug 41 of the same pawl, this last mentioned lug 41 further acting as a return abutment for annular member 11, i. e. playing the same part as pin 14 of the embodiment illustrated by Figs. 5 and 6.

It will be readily understood that the positions of pawl 38 and consequently those of piece 5 and flanges 2 and 3 depend upon the position of annular member 34, on which cable 33 is fixed.

I further provide an annular member 42, adjacent to member 34 and concentric therewith, free to rotate with respect to the frame, but I limit the amplitude of its rotary movements by engaging in a slot 43 thereof a pin 44 carried by annular member 34.

The inner face of this annular member 42 is given a suitable profile including a sloping surface and a step, as shown by Figs. 14 to 18 the function of which will appear hereinafter.

Finally, I may provide on the wall of frame 9 small projections 9a and 9b, which will also be referred to hereinafter.

As for flange 19, it is provided with five radial projections 47 at angular intervals from one another corresponding to shifting from one selection position to the next one, this angular spacing corresponding to the angle between two consecutive positions of selection of the flanges.

These projections 47 are arranged to cooperate, in the course of the longitudinal displacements of flange 19, with either of two inclined surfaces 48 provided on a rod 49 (Fig. 13) extending longitudinally in frame 9 and making a suitable angle with the axis XX of the device. Projections 47 cooperate with one or the other of these inclined surfaces 48 according to the initial position of the parts.

In the position shown by Figs. 10–11, the reaction on the inclined surface 48 on the right hand side of the projection 47 that cooperates therewith can be balanced by the reaction of flange 3 on frame 9 (action and reaction effect in cable and sheath system 33—35). But when this projection 47 cooperates with the inclined surface 48 on the left hand side, there is no longer contact of 3 with 9. It is therefore necessary to provide a suitable friction of piece 5 in member 11.

With such an arrangement, every longitudinal displacement of flange 19 causes it automatically to shift from one selection position to the next one. Annular member 11, which turns together with piece 5, which itself turns together with flange 19, follows this movement and is held by pawl 38, coacting with a notch of annular member 34, in the position into which it is thus brought.

According to the law of automaticity that is chosen and according to what means are brought into play to cause the pawl to escape from a notch in the direction opposed to that with which it entered said notch, it may be of interest to have the cooperation of flange 19 with inclined surfaces 48 controlled as follows.

Intending for instance to obtain two automatic gear shiftings such as reverse into first gear and vice-versa, and second to third gear and vice-versa, I make use of the following arrangement.

The inner peripheries of annular members 34 and 42 and frame 9 are given outlines such as diagrammatically shown in Figs. 14 to 18 (the periphery of frame 9 being shown by a thick line, that of annular member 34 by a thin line with vertical hatching and that of annular member 42 by a thin line with horizontal hatching).

Engagement of projections 47 with inclined surfaces 48 is operative (i. e. causes flange 19 to rotate) only when shifting into a higher gear (i. e. from reverse to first or from second to third). As a matter of fact rotation of flange 19 in the opposed direction is made impossible by the engagement of the pawl into the notches of annular member 34. In order to obviate this, the inclined surface 48 yields to the thrust of the projection 47 that is acting thereon when the movement of flange 19 would tend to cause a shifting into the next lower gear selection position. This yielding of inclined surfaces 48 is for instance obtained by allowing rod 49 to pivot about its axis in its housing. And once flange 19 has moved past the inclined surface 48 that is considered, said rod 49 is returned to its initial position by spring 12 bearing upon an eccentric blade 50 carried by the end of rod 49, this blade being inserted between spring 12 and lug 13, made of a special shape for this purpose, fixed in the frame (see Figs. 5 and 6), whereby rod 49 can turn only in one direction, that of arrow $f$ (Fig. 11).

In the case of the example shown by Fig. 10, when flange 19 moves from left to right, one of its projections 47 comes into contact with one of the inclined surfaces 48 which compels flange 19 to rotate in the direction of arrow $f'$ (Fig. 11) through an angle corresponding to the interval between two projections 47. If, on the contrary, flange 19 is moving from right to left, it keeps its angular position, causing inclined surface 48 to yield by rotation of rod 49 in the direction of arrow $f$ (Fig. 11).

In Figs. 14 to 18, I have designated:

By a circle with a cross therein the pivot axis 39 of pawl 38, this axis being carried by annular member 11;

By a circle with hatching therein the lug 40 that is to engage the notches of annular member 34;

By two concentric circles the lug 41 on which bears spring 12 (not shown in these views).

Figures 14, 15, 16, 17:
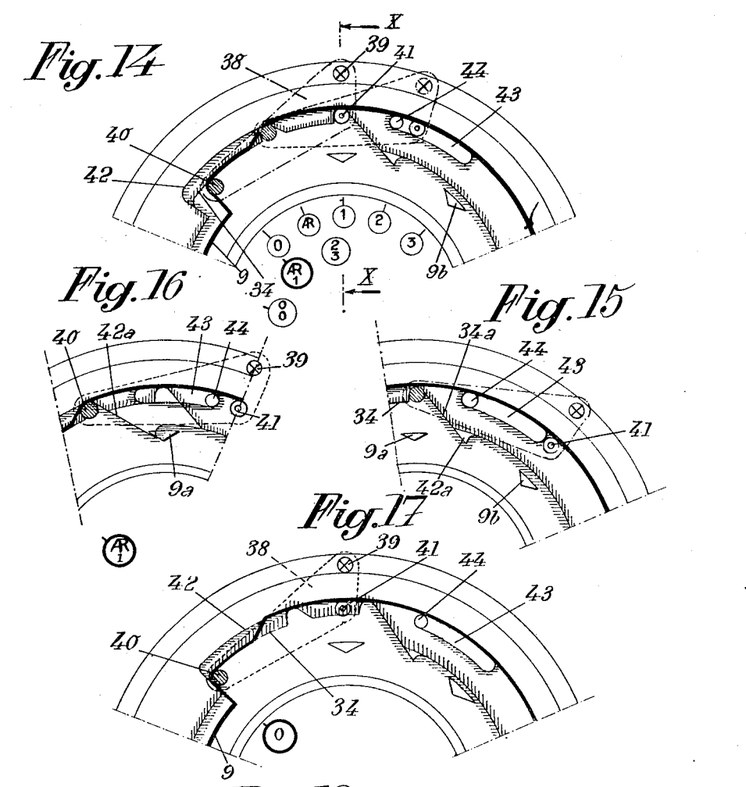
Figs. 14, 15, 16, 17 and 18 are diagrams intended to illustrate the operation of the device.

The operation of this device is then as follows:

In Fig. 14, annular member 34 is positioned for shifting from reverse to first gear (as indicated on the graduation by the thick line circle). Pawl 38, as shown in dot-and-dash lines, is in neutral selection position. The vehicle is supposed also to be in neutral.

When the clutch pedal is operated, the longitudinal displacement imparted to flange 19 causes it to rotate into a selection position corresponding to reverse gear. Flange 19 also drives pawl 38 the lug 40 of which then comes to engage the first notch of annular member 34, which is fixed in position (position of pawl 38 shown in dotted lines in Fig. 14).

Further operation of clutch pedal 25 likewise rotates flange 19 through an angle corresponding to the angular interval between two projections 47, bringing it into first gear selection position (Fig. 15, in which lug 40 engages the second notch of annular member 34).

If clutch pedal 34 is operated once more, flange 19 comes into second gear selection position, driving pawl 38 the lug 40 of which travels along the oblique portion 34a of annular member 34, which oblique portion partly coincides with an oblique portion 42a of annular member 42, and finally comes to drop behind the ridge of said sloping portion 42a. But, under the effect of spring 12 acting upon lug 41, the pawl moves back toward the left, its lug 40 being kept out of engagement with the notches of annular member 34 by annular member 42, which moves therewith, this movement of said annular member 42 being possible owing to its slot 43. Lug 40 thus comes into contact with the projection 9a of frame 9 at the end of the movement of said slot 43, which projection 9a causes said lug to move out from the ridge of sloping portion 42a (Fig. 16) and to move down along said sloping portion until it drops into the next notch of annular member 34, which notch corresponds to reverse gear selection position.

Thus the pawl has moved from the first gear position into the second gear position, from which it is driven off and spring 12 brings it back into reverse gear position.

Of course, these operations take place during the resetting of spring 18 to make the device ready to work for the next operation.

For automatic shifting from second to third gears and vice-versa, annular member 34 is positioned, by a pull exerted on cable 33, in a position two divisions away from the first considered position and lug 40 is cause to coact, for return from third to second gear position, with projection 9b.

Fig. 17 shows the neutral selection position, corresponding to a control system solely by hand through angular displacement of annular member 34 for every operation, lug 40 remaining constantly in the angle of the profile of this member where it is shown.

Figure 18:
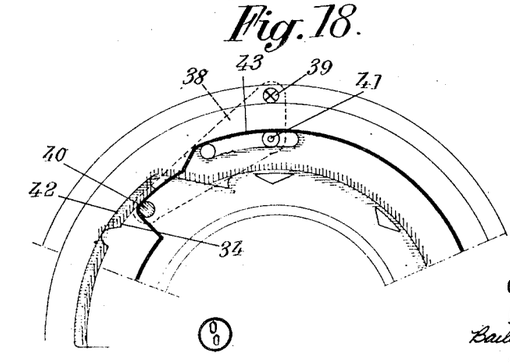

Finally, in Fig. 18, I have shown a special neutral position for which lug 40 is stopped by the profile of frame 9, but annular member 34, and therefore annular member 42, are pushed back farther toward the rear. This position may be used as a transition for shifting from manual control alone into partly automatic control by means of the lever 51 shown by Fig. 19, adapted to pull cable 33 and cooperating with holding notches for the various marked positions, which notches are provided in a sector 52 fixed for instance to steering rod 53, and disposed along two windows 54 and 55 corresponding respectively to exclusively manual control M and to partly automatic control A. If a single kind of control is to be provided, I may provide only one of these windows.

It should be noted that, concerning automatic control, it is possible, after having shifted from reverse gear to first gear, to place annular member 34 into automatic working position corresponding to the second and third gears and then to operate clutch pedal 25. This will cause shifting from first to second gears. A further action will cause shifting from second to third, the next one from third to second, and so on.

Of course, the above described construction corresponds to a law of automaticity taken merely by way of example and having no limitative character. Furthermore, temporary modifications may be brought thereto.

Figure 20:
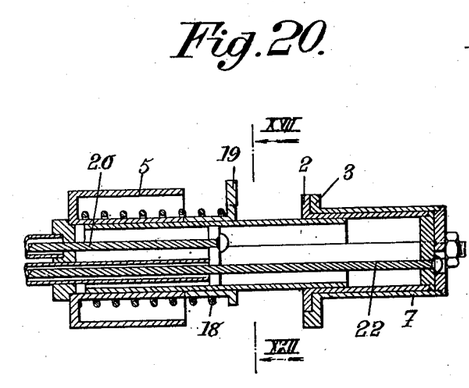

Likewise, according to another embodiment of the invention (Figs. 20-21), instead of making use of pieces in the form of bodies of revolution, I employ, to cause the various flanges and annular members 2, 3, 5, 10, 11 to turn together, pieces of prismatic shape. This modification leads to interesting constructions, especially when it is advantageous to provide both of the cables 20 and 22 on the same side of the device.

When the amplitudes of the movements of the gear box control rods (and generally speaking of the parts to be actuated by means of the relay) are different, the device is to be designed for the largest amplitude and the difference would be compensated for the others by providing lugs such as 56 (Figs. 10 and 11) in the form of a part slidable in a slot 57 longer than lug 56.

Relay devices according to my invention are simpler than the devices used for similar purposes up to this time and facilitate the operations to be performed by the driver or other person utilizing them.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A mechanical relay of the type described which comprises, in combination, a fixed support, at least two secondary elements, adapted to act upon the mechanism to be controlled by said relay, individually reciprocable with respect to said support parallelly to one direction, at least two primary parts movably mounted with respect to said support for both simultaneous movement of said two parts as a whole in a direction transverse to said first mentioned direction with respect to said support and relative displacement of said two parts with respect to each other parallel to the first mentioned direction, selecting means movable with respect to said support in said transverse direction, connecting means between said selecting means and said two parts, for transmitting to said two parts the transverse displacements of said selecting means, said connecting means being elastically deformable in said transverse direction and arranged to leave said parts freely movable in the first mentioned direction with respect to said support, and control means operative by external energy and interposed exclusively between said two primary parts without operative connection with said support for imparting to said two parts a relative to and fro displacement with respect to each other in the first mentioned direction, said primary parts, secondary elements and support being provided respectively with cooperating projections and recesses to impart to at least one of said secondary elements, in response to said reciprocating displacement of said primary parts, a predetermined displacement with respect to said support, the choice of said particular secondary element and of the displacement imparted thereto being determined by said selecting means.

2. A mechanical relay of the type described which comprises, in combination, a fixed support, at least two secondary elements, adapted to act upon the mechanism to be controlled by said relay, individually reciprocable with respect to said support parallelly to one direction, at least two primary parts movably mounted with respect to said support for both simultaneous movement of said two parts as a whole in a direction transverse to said first mentioned direction with respect to said support and relative displacement of said two parts with respect to each other parallel to the first mentioned direction, selecting means movable with respect to said support in said transverse direction, connecting means between said selecting means and said two parts, for transmitting to said two parts the transverse displacements of said selecting means, said connecting means being elastically deformable in said transverse direction and arranged to leave said parts freely movable in the first mentioned direction with respect to said support, control means operative by external energy and interposed exclusively between said two primary parts without operative connection with said support for imparting to said two parts a relative displacement thereof in the first mentioned direction and elastic means for returning said primary parts, upon release thereof by said control means, into their initial position relatively to each other, said primary parts, secondary elements and support being provided respectively with cooperating projections and recesses to impart to at least one of said secondary elements, in response to said successive opposed relative displacements of said primary parts, a predetermined displacement with respect to said support, the choice of said particular secondary element and of the displacement imparted thereto being determined by said selecting means.

3. A mechanical relay of the type described which comprises, in combination, a fixed casing, at least two secondary elements, adapted to act upon the mechanism to be controlled by said relay, individually reciprocable in said casing longitudinally parallelly to an axis thereof, at least two primary parts movably mounted in said casing for both simultaneous rotary movement of said parts as a whole about said axis with respect to said casing and longitudinal movement of said parts with respect to each other, selecting means rotatable with respect to said casing about said axis, connecting means between said selecting means and said two primary parts for bringing said two parts as a whole into a given position of adjustment in response to the bringing of said selecting means into a predetermined position, said connecting means being elastically deformable to enable said two parts to turn slightly about said axis with respect to said selecting means and being arranged to leave said two parts freely movable in the longitudinal direction with respect to said casing, control means operative by external energy and interposed exclusively between said two primary parts without operative connection with said casing for imparting to said two primary parts a longitudinal relative displacement in one direction with respect to each other, elastic means for imparting to said primary parts, upon release thereof by said control means, a longitudinal relative displacement of the same amplitude as the first mentioned one and in the reverse direction, said primary parts, secondary elements and casing being provided respectively with cooperating projections and recesses arranged to impart to at least one of said secondary elements, in response to two such successive opposed longitudinal displacements of said primary parts, a given displacement with respect to said casing, the choice of said particular secondary element and of the displacement imparted thereto being determined by the adjustment of said selecting means.

4. A mechanical relay of the type described which comprises, in combination, a fixed casing, at least two secondary elements, adapted to act upon the mechanism to be controlled by said relay, individually reciprocable in said casing longitudinally with respect to an axis thereof, two primary parts movably mounted in said casing for both simultaneous rotary movement of said parts as a whole about said axis with respect to said casing and longitudinal movement of said parts with respect to each other, a longitudinal rod in said casing slidable longitudinally with respect to both of said primary parts, a flange fixed to said rod, a piece slidable on said rod rigidly connected with one of said primary parts, a spring interposed between said piece and said flange, selecting means rotatable with respect to said casing about said axis, connecting means between said selecting means and said two primary parts for bringing said two parts as a whole into a given position of adjustment in response to the bringing of said selecting means into a predetermined position, said connecting means being elastically deformable to enable said two parts to turn slightly about said axis with respect to said selecting means and being arranged to leave said two parts freely movable in the longitudinal direction with respect to said casing, control means operative by external energy and independent of said casing for moving said rod and said piece longitudinally with respect to each other against the action of said spring, and control means operative by external energy and independent of said casing for moving said rod and the other of said primary parts with respect to each other to move said primary parts relatively to each other in the direction opposed to that in which said spring tends to urge them, said primary parts, secondary elements and casing being provided respectively with cooperating projections and recesses arranged to impart to at least one of said secondary elements, in response to every two such successive opposed longitudinal displacements of said primary parts caused by the action of the second mentioned control means and the subsequent release of said spring by the first mentioned control means, a given displacement with respect to said casing, the choice of said particular secondary element and of the displacement imparted thereto being determined by the position of adjustment of said selecting means.

5. A relay according to claim 4 further including elastic means for resiliently opposing rotation in one direction of the whole of said primary parts with respect to said casing, said last mentioned elastic means cooperating in the transmission of the longitudinal movement of said primary parts to said secondary elements.

6. A relay according to claim 4 further including an annular member journalled on said casing about said axis, said annular member being connected with the piece slidable on the rod so as to permit longitudinal sliding of said piece in said annular member but to cause said piece and said member to rotate together about said axis, spring means between said annular member and said casing for elastically opposing rotation of said member in one direction with respect to said casing, said last mentioned spring means cooperating in the transmission of the longitudinal movement of said primary parts to said secondary elements, a second annular member journalled on said casing coaxially with the first annular member, means operative from a distance for rotating said second mentioned annular member in the direction of rotation opposed by said spring, and means for transmitting rotary motion from said second to said first mentioned annular member, said last mentioned means being of the lost motion kind whereby said first annular member can rotate slightly ahead of the other annular member.

7. A relay according to claim 4 further including means carried by said casing and arranged to cooperate with said flange for rotating said flange through a given angle about said axis in response to at least some longitudinal displacements thereof so as automatically to modify the angular adjustment of said primary parts as a whole about said axis with respect to said casing.

8. In control mechanism for a change speed transmission having shiftable elements for controlling the speed ratios, concentric cylindrical members mounted for relative axial sliding movement and simultaneous rotation, means for selectively connecting the shiftable elements to each cylindrical member by rotation of the cylindrical members, selecting means for rotating the cylindrical members, elastic transmission means being interposed between said selecting means and said cylindrical members, and means interposed exclusively between said cylindrical members for axially sliding them with respect to one another.

9. A mechanical relay of the type described for operating a mechanism which comprises, in combination, a fixed support, at least two secondary elements, adapted to act upon said mechanism, individually reciprocable with respect to said support parallelly to said direction, at least two primary parts movably mounted with respect to said support for both simultaneous movement of said two parts as a whole in a direction transverse to said support and relative displacement of said two parts with respect to each other parallel to the first mentioned direction, selecting means movable with respect to said support in said transverse direction, connecting means between said selecting means and said two parts, for transmitting to said two parts the transverse displacements of said selecting means, said connecting means being elastically deformable in said transverse direction and arranged to leave said parts freely movable in the first mentioned direction with respect to said support, control means operative by external energy and independent of said support for imparting to said two primary parts a relative displacement thereof toward each other in the first mentioned direction, elastic means for urging said two primary parts away from each other in said first mentioned direction and means for limiting the distance between these two parts in said first mentioned direction, said primary parts, secondary elements and support being provided respectively with cooperating projections and recesses to impart to at least one of said secondary elements, in response to said successive opposed relative displacements of said primary parts, a predetermined displacement with respect to said support, the choice of said particular secondary element and of the displacement imparted thereto being determined by said selecting means.

10. A mechanical relay of the type described for operating a mechanism which comprises, in combination, a fixed support, at least two secondary elements, adapted to act upon said mechanism, individually reciprocable with respect to said support parallelly to said direction, at least two primary parts movably mounted with respect to said support for both simultaneous movement of said two parts as a whole in a direction transverse to said support and relative displacement of said two parts with respect to each other parallel to the first mentioned direction, selecting means movable with respect to said support in said transverse direction, connecting means between said selecting means and said two parts, for transmitting to said two parts the transverse displacements of said selecting means, said connecting means being elastically deformable in said transverse direction and arranged to leave said parts freely movable in the first mentioned direction with respect to said support, control means operative by external energy and independent of said support for imparting to said two primary parts a relative displacement thereof away from each other in the first mentioned direction to a given distance and elastic means for urging said primary parts toward each other in said first mentioned direction, said primary parts, secondary elements and support being provided respectively with cooperating projections and recesses to impart to at least one of said secondary elements, in response to said successive opposed relative displacements of said primary parts, a predetermined displacement with respect to said support, the choice of said particular secondary element and of the displacement imparted thereto being determined by said selecting means.

11. A mechanical relay of the type described for operating a mechanism which comprises, in combination, a fixed support, at least two secondary elements, adapted to act upon said mechanism, individually reciprocable with respect to said support parallelly to said direction, at least two primary parts movably mounted with respect to said support for both simultaneous movement of said two parts as a whole in a direction transverse to said support and relative displacement of said two parts with respect to each other parallel to the first mentioned direction, selecting means movable with respect to said support in said transverse direction, connecting means between said selecting means and said two parts, for transmitting to said two parts the transverse displacements of said selecting means, said connecting means being elastically deformable in said transverse direction and arranged to leave said parts freely movable in the first mentioned direction with respect to said support, control means operative by external energy and independent of said support for imparting to said two primary parts a relative displacement thereof toward each other in the first mentioned direction, elastic means directly interposed between said two primary parts for urging them away from each other in said first mentioned direction and means for limiting the distance between these two parts in said first mentioned direction, said primary parts, secondary elements and support being provided respectively with cooperating projections and recesses to impart to at least one of said secondary elements, in response to said successive opposed relative displacements of said primary parts, a predetermined displacement with respect to said support, the choice of said particular secondary element and of the displacement imparted thereto being determined by said selecting means.

12. A mechanical relay of the type described for operating a mechanism which comprises, in combination, a fixed casing, at least two secondary elements, adapted to act upon said mechanism, individually reciprocable in said casing longitudinally in a direction parallel to an axis thereof, at least two primary parts movably mounted in said casing for both simultaneous rotary movement of said parts as a whole about said axis with respect to said casing and relative longitudinal movement of said parts with respect to each other, selecting means rotatable with respect to said casing about said axis, connecting means between said selecting means and said two primary parts for bringing said two parts as a whole into a given position of adjustment in response to the bringing of said selecting means into a predetermined position, said connecting means being elastically deformable to enable said two parts to turn slightly about said axis with respect to said selecting means and being arranged to leave said two parts freely movable in the longitudinal direction with respect to said casing, control means operative by external energy and independent of said support for imparting to said two primary parts a longitudinal relative displacement toward each other, elastic means for urging said two parts longitudinally away from each other and means for limiting the longitudinal distance between these two parts, said primary parts, secondary elements and casing being provided respectively with cooperating projections and recesses arranged to impart to at least one of said secondary elements, in response to two successive opposed longitudinal displacements of said primary parts, a given displacement with respect to said casing, the choice of said particular secondary element and of the displacement imparted thereto being determined by the adjustment of said selecting means.

13. A mechanical relay of the type described for operating a mechanism which comprises, in combination, a fixed casing, at least two secondary elements, adapted to act upon said mechanism, individually reciprocable in said casing longitudinally in a direction parallel to an axis thereof, at least two primary parts movably mounted in said casing for both simultaneous rotary movement of said parts as a whole about said axis with respect to said casing and relative longitudinal movement of said parts with respect to each other, selecting means rotatable with respect to said casing about said axis, connecting means between said selecting means and said two primary parts for bringing said two parts as a whole into a given position of adjustment in response to the bringing of said selecting means into a predetermined position, said connecting means being elastically deformable to enable said two parts to turn slightly about said axis with respect to said selecting means and being arranged to leave said two parts freely movable in the longitudinal direction with respect to said casing, control means operative by external energy and independent of said support for imparting to said two primary parts a longitudinal relative displacement away from each other to a given distance, and elastic means for urging said two parts longitudinally toward each other, said primary parts, secondary elements and casing being provided respectively with cooperating projections and recesses arranged to impart to at least one of said secondary elements, in response to two successive opposed longitudinal displacements of said primary parts, a given displacement with respect to said casing, the choice of said particular secondary element and of the displacement imparted thereto being determined by the adjustment of said selecting means.

14. In an automobile vehicle including a frame, a gear box and a clutch, the combination of a fixed casing carried by said frame, at least two control members for operating said gear box individually reciprocable in said casing longitudinally with respect to an axis thereof, two primary parts movably mounted in said casing for both simultaneous rotary movement of said parts as a whole about said axis with respect to said casing and longitudinal movement of said parts with respect to each other, a longitudinal rod in said casing slidable longitudinally with respect to both of said primary parts, a flange fixed to said rod, a piece slidable on said rod rigidly connected with one of said primary parts, a spring interposed between said piece and said flange, selecting means rotatable with respect to said casing about said axis, connecting means between said selecting means and said two primary parts for bringing said two parts as a whole into a given position of adjustment in response to the bringing of said selecting means into a predetermined position, said connecting means being elastically deformable to enable said two parts to turn slightly about said axis with respect to said selecting means and being arranged to leave said two parts freely movable in the longitudinal direction with respect to said casing, a clutch actuating member reciprocable with respect to said frame to control engagement and disengagement of said clutch, control means independent of said casing for moving said rod and said piece longitudinally with respect to each other against the action of said spring, means operative by relative displacements of said clutch actuating member with respect to said frame for operating said control means as said clutch actuating member is being moved from clutch disengagement position toward clutch engagement position and for releasing said control means only at the end of the return movement of said clutch actuating member toward clutch disengagement position, control means independent of said casing for moving said rod and the other of said primary parts with respect to each other to move said primary parts relatively to each other in the direction opposed to that in which said spring tends to urge them, and means operative by relative displacements of said clutch actuating member with respect to said frame for operating said second mentioned control means during the end of the movement of said actuating member from clutch engagement to clutch disengagement position, said primary parts, secondary elements and casing being provided respectively with cooperating projections and recesses arranged to impart to at least one of said secondary elements, in response to every two such successive opposed longitudinal displacements of said primary parts caused by the action of the second mentioned control means and the subsequent release of said spring by the first mentioned control means, a given displacement with respect to said casing, the choice of said particular secondary element and of the displacement imparted thereto being determined by the position of adjustment of said selecting means.

15. A relay according to claim 4 further including an annular member journalled on said casing about said axis, said annular member being connected with the piece slidable on the rod so as to permit longitudinal sliding of said piece in said annular member but to cause said piece and said member to rotate together about said axis, spring means between said annular member and said casing for elastically opposing rotation of said member in one direction with respect to said casing, said last mentioned spring means cooperating in the transmission of the longitudinal movement of said primary parts to said secondary elements, a second annular member journalled on said casing coaxially with the first annular member, means operative from a distance for rotating said second mentioned annular member in the direction of rotation opposed by said spring, means for transmitting rotary motion from said second to said first mentioned annular member, said last mentioned means being of the lost motion kind whereby said first annular member can rotate slightly ahead of the other annular member, radial projections carried by said flange, a rod carried by said casing having inclined surfaces adapted to cooperate with said projections for causing said flange to rotate through a given angle on at least some of the longitudinal displacements of said flange, and pawl and ratchet means carried by said first annular member and said casing respectively for holding said primary parts in given angular positions about said axis.

16. A relay according to claim 4 further including an annular member journalled on said casing about said axis, said annular member being connected with the piece slidable on the rod so as to permit longitudinal sliding of said piece in said annular member but to cause said piece and said member to rotate together about said axis, spring means bteween said annular member and said casing for elastically opposing rotation of said member in one direction with respect to said casing, said last mentioned spring means cooperating in the transmission of the longitudinal movement of said primary parts to said secondary elements, a second annular member journalled on said casing coaxially with the first annular member, means operative from a distance for rotating said second mentioned annular member in the direction of rotation opposed by said spring, means for transmitting rotary motion from said second to said first mentioned annular member, said last mentioned means being of the lost motion kind whereby said first annular member can rotate slightly ahead of the other annular member, radial projections carried by said flange, a rod carried by said casing having inclined surfaces adapted to cooperate with said projections for causing said flange to rotate through a given angle on at least some of the longitudinal displacements of said flange, pawl and ratchet means carried by said first annular member and said casing respectively for holding said primary parts in given angular positions about said axis, said rod provided with inclined surfaces being pivotally mounted about its own axis in said casing so as to be able to pivot in one direction from its normal position, and spring means for elastically opposing this pivoting, whereby said inclined surfaces yield to the action of the flange projections engaging them when said flange is moving in one direction.

17. A relay according to claim 4 further including an annular member journalled on said casing about said axis, said annular member being connected with the piece slidable on the rod so as to permit longitudinal sliding of said piece in said annular member but to cause said piece and said member to rotate together about said axis, spring means between said annular member and said casing for elastically opposing rotation of said member in one direction with respect to said casing, said last mentioned spring means cooperating in the transmission of the longitudinal movement of said primary parts to said secondary elements, a second annular member journalled on said casing coaxially with the first annular member, means operative from a distance for rotating said second mentioned annular member in the direction of rotation opposed by said spring, means for transmitting rotary motion from said second to said first mentioned annular member, said last mentioned means being of the lost motion kind whereby said first annular member can rotate slightly ahead of the other annular member, radial projections carried by said flange, a rod carried by said casing having inclined surfaces adapted to cooperate with said projections for causing said flange to rotate through a given angle on at least some of the longitudinal displacements of said flange, pawl and ratchet means carried by said first annular member and said casing respectively for holding said primary parts in given angular positions about said axis, said rod provided with inclined surfaces being pivotally mounted about its own axis in said casing so as to be able to pivot in one direction from its normal position, and spring means for elastically opposing this pivoting, whereby said inclined surfaces yield to the action of the flange projections engaging them when said flange is moving in one direction, the second mentioned annular member including surfaces adapted to cooperate with said pawl means for modifying the effect of said inclined surfaces.

GASTON ROBERT BOUCHARD.

REFERENCES CITED

The following references are of record in the file of this patent:

UNITED STATES PATENTS

| Number | Name | Date |
| --- | --- | --- |
| 2,173,080 | Randol | Sept. 12, 1939 |
| 2,221,199 | Peo | Nov. 12, 1940 |
| 2,434,051 | Randol | Jan. 6, 1948 |

FOREIGN PATENTS

| Number | Country | Date |
| --- | --- | --- |
| 435,028 | Great Britain | Sept. 11, 1935 |
| 782,351 | France | June 4, 1935 |